Patented Feb. 15, 1927.

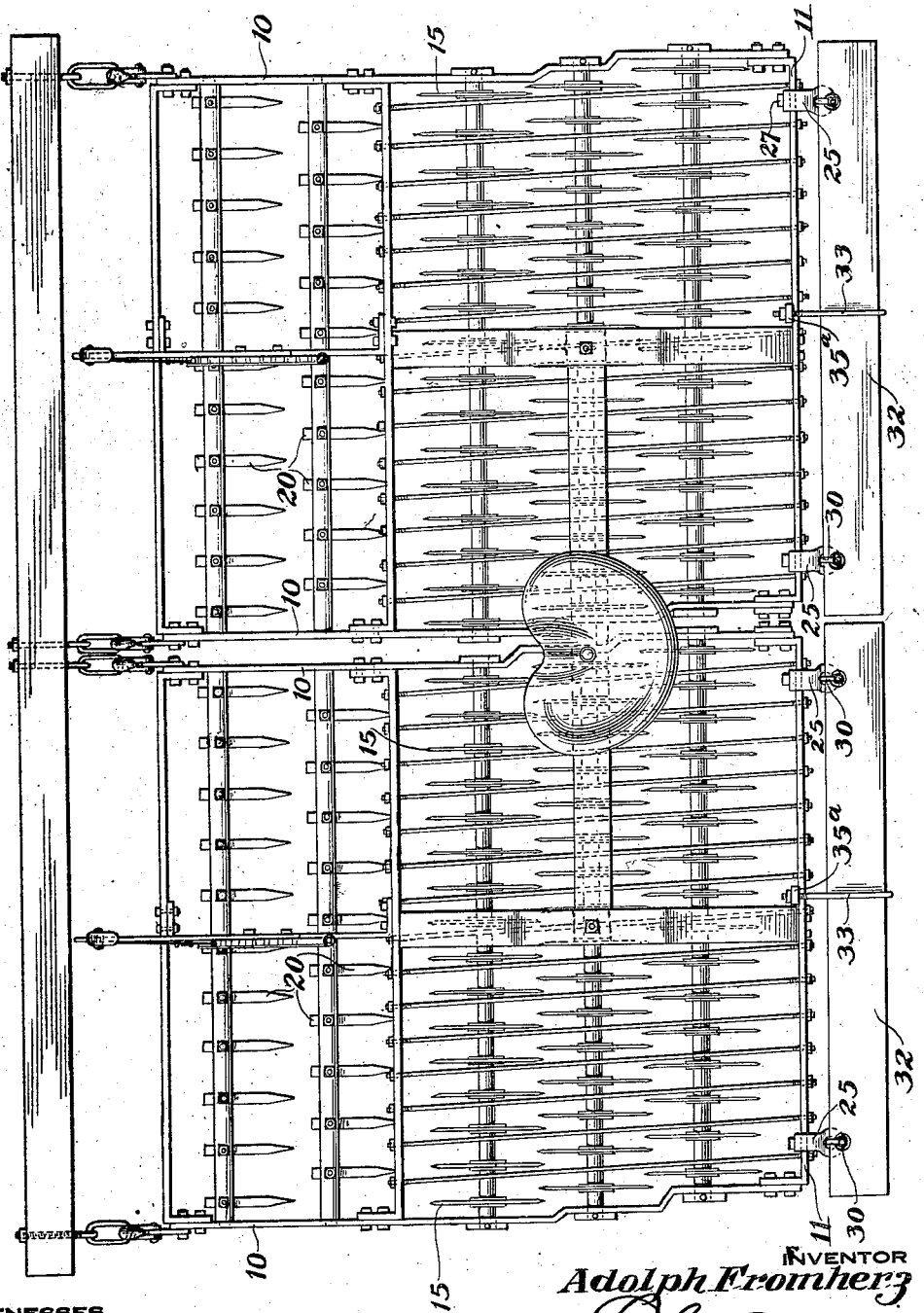

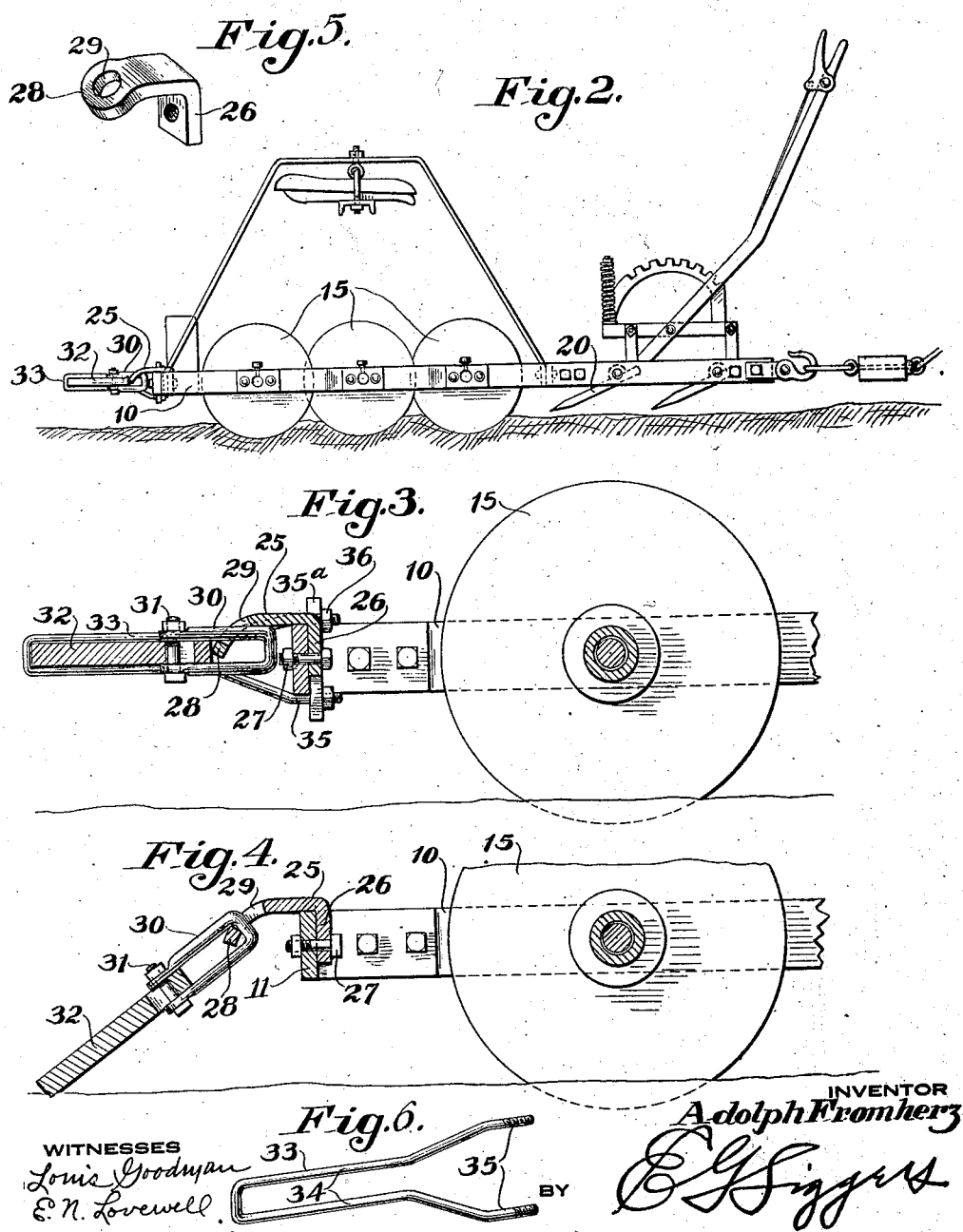

1,618,076

UNITED STATES PATENT OFFICE.

ADOLPH FROMHERZ, OF CORVALLIS, OREGON.

COMBINATION HARROW AND SMOOTHING BLADE.

Application filed October 15, 1923. Serial No. 668,668.

This invention relates to a combination harrow and smoothing blade, which is adapted to break up clods and the like, and to leave a smooth, finely pulverized surface soil.

The general object of the invention is to provide a pulverizer of the character described, which is simple in construction and easily adjustable to adapt it for use under varying conditions and with any kind of soil, when preparing the seed bed.

The invention consists further in specific features of construction and various combinations thereof, which will be more clearly apparent from the detailed description which follows, and will be subsequently pointed out in the claims.

In describing the invention, reference will be had to the accompanying drawings, in which—

Figure 1 is a plan view of the invention.

Figure 2 is a side elevation thereof.

Figure 3 is a vertical longitudinal section through the rear part of the invention, showing the smoothing blade in elevated or inoperative position.

Figure 4 is a similar view showing the smoothing blade in lowered or operative position.

Figure 5 is a detail perspective view of one of the brackets which support the smoothing blades.

Figure 6 is a detail perspective view of one of the clamps for securing the smoothing blades in inoperative position.

The device, which constitutes my invention, is made up of one or more sections, each comprising a frame with side bars 10 connected at their rear ends by a transverse bar 11. The means for pulverizing the soil preferably includes disks 15 rotatably mounted in the frame, and also rearwardly and downwardly inclined teeth 20.

For the purpose of attaching a smoothing blade or drag to the rear of the harrow a number of brackets 25 are secured in spaced relation on the rear frame bar 11. Each of these brackets has a downturned flange 26 at its front end, which is secured to the bar 11 by a bolt 27 or the like. The rear portion of the bracket 25 is bent downwardly, as shown at 28 in Figures 3, 4 and 6, and is provided with a hole 29, through which a clevis 30 is inserted. The eyes of the clevis are connected by a pin or bolt 31, which passes through an opening in the forward upper portion of a smoothing blade 32, which is preferably made of iron in order to give sufficient weight thereto. When in operative position, the blade 32 is held so as to drag over the ground, as shown in Figure 4. When it is not desired to use the smoothing blade, the clevis 30 is drawn inwardly underneath the bracket 25, as shown in Figure 3, in which position the engagement of the clevis with the bracket will serve to support the blade 32 above the ground. In order to prevent the clevis and blade from being jarred loose from this position, a clamp 33 is provided. This clamp includes spaced arms 34, which snugly receive the blade 32 between them, and the forward portions of the arms are spread outwardly, as shown at 35, so as to pass on either side of the bar 11. The forward ends of the clamp arms may be received by washer plates 35$^a$ and their threaded ends provided with nuts 36, by means of which the blade 32 and clevises 30 are firmly clamped to the bracket 25. By this construction the blade may be secured in a substantially horizontal position and may be used by the driver to stand on when driving the machine to and from the field.

From the foregoing description it will be understood that the harrow teeth 20 serve to smooth out and partially pulverize the large lumps, while the disks 15 thoroughly pulverize the ground including any clods or lumps, which may escape the teeth 20. When the smoothing blades 32 are in operation, they serve to complete the pulverization and to smooth out the dirt left by the disks 15, leaving a perfectly smooth seed bed and providing a dust mulch, which will cover any clover seed or grass seed subsequently sown, and insure its germination. With the blades 32 and the harrow teeth 20 raised, the machine may be used when the grain is four or five inches high to loosen the top crust of the ground without injuring the grain.

While I have shown and described specifically the preferred form of the invention, it is to be understood that this is merely illustrative and that various modifications may be made in the size, proportion and arrangement of the parts, as well as in the minor details of construction without sacrificing any of the salient features of the invention as expressed in the claims.

What is claimed is:

1. In a device of the character described, the combination of a frame having earth working elements mounted therein, brackets secured to and extending rearwardly from the frame and having rearwardly and downwardly curved perforated ends, a clevis loosely supported in each perforation, a smoothing blade secured to the clevises and normally in dragging relation to the ground, said smoothing blade, when raised to a horizontal position, being slidable forwardly to move the clevises into engagement with the undersides of the brackets in front of the perforations, and thereby to support the smoothing blade out of contact with the ground.

2. In a device of the character described, the combination of a frame having earth working elements mounted therein, brackets secured to and extending rearwardly from the rear portion of the frame and having downwardly curved perforated ends, a clevis loosely supported in each perforation, a smoothing blade secured to the clevises and normally in dragging relation to the ground, a clamping member having spaced arms adapted to embrace the smoothing blade, and means engaging said arms and cooperating with said clamping member, brackets, clevises and frame to secure said blade out of contact with the ground.

3. In a device of the character described, the combination of a frame having earth working elements mounted therein, brackets secured to and extending rearwardly from the frame and having rearwardly and downwardly curved perforated ends, a clevis loosely supported in each perforation, a smoothing blade secured to the clevises and normally in dragging relation to the ground, said smoothing blade, when raised to a horizontal position, being slidable forwardly to move the clevises into engagement with the under sides of the brackets in front of the perforations and thereby to support the smoothing blade in substantially horizontal position out of contact with the ground, a clamping member having spaced arms adapted to embrace the smoothing blade, and means to secure said clamping member to the frame in such a manner as to hold said smoothing blade in its horizontal forward position out of contact with the ground.

In testimony, that I claim the foregoing as my own, I have hereto affixed my signature.

ADOLPH FROMHERZ.